United States Patent [19]

Hughes

[11] 3,856,575
[45] Dec. 24, 1974

[54] ELECTRIC CELL WITH WIDE AND NARROW POSITIVE AND NEGATIVE PLATES AND PLATE STRAP ATTACHMENT

[75] Inventor: Herbert Denis Hughes, Evesham, England

[73] Assignee: Alkaline Batteries Limited, Redditch, Worcestershire, England

[22] Filed: Apr. 2, 1973

[21] Appl. No.: 346,804

[30] Foreign Application Priority Data
Apr. 6, 1972 Great Britain.................... 15971/72

[52] U.S. Cl................ 136/134, 136/14, 136/100 R, 136/107, 136/135, 136/175
[51] Int. Cl.......................................... H01m 37/00
[58] Field of Search........ 136/13, 14, 134 R, 134 P, 136/135 R, 135 S, 175, 176, 100 R, 107, 24, 28, 147

[56] References Cited
UNITED STATES PATENTS
2,575,076   11/1951   Smyth............................ 136/135 R
2,616,015   10/1952   Glasener et al................... 136/13 X
3,245,837   4/1966   Ikeda et al....................... 136/28 X
3,287,163   11/1966   Steffens........................... 136/134 P Primary Examiner—Winston A. Douglas
Assistant Examiner—John F. Niebling
Attorney, Agent, or Firm—Watson, Cole, Grindle & Watson

[57] ABSTRACT

An electric cell of alkaline type has a cylindrical casing containing rectangular positive and negative plates of pocket type lying in planes parallel to the axis of the casing the outer plates being narrower than the middle ones. The plates of each polarity are provided with a plate strap of foil strip, one strip passing circumferentially round and being wlded to corresponding plates of one polarity, and the other passing similarly round and being welded to corresponding edges of the plates of the other polarity, to connect the plates of each polarity together and to an external terminal. In assembly the plates of one polarity are assembled in a jig with corresponding edges lying in a plane, but with the spacing of end plates greater than that of middle plates, and the plate strap is spot welded to their aligned edges.

5 Claims, 9 Drawing Figures

ELECTRIC CELL WITH WIDE AND NARROW POSITIVE AND NEGATIVE PLATES AND PLATE STRAP ATTACHMENT

This invention relates to electric cells of alkaline type of cylindrical shape.

According to the present invention an electric cell of alkaline type has rectangular positive and negative plates of pocket type in a cylindrical casing lying in planes parallel to the axis of the casing, the outer plates being narrower than the middle ones, and the plates of each polarity are provided with a plate strap of foil strip one passing circumferentially round and being welded to corresponding edges of plates of one polarity, and the other passing similarly round and being welded to corresponding edges of the plates of the other polarity, to connect the plates of each polarity together and to an external terminal.

In order that a plate strap may extend to one end of the cell it may be folded along a line at about 45° to its length.

Preferably, the plates are separated by a strip of separator material folded zig-zag fashion round the edges of the plates of each polarity opposite to those to which the plate strap is secured. One plate strap may then conveniently be connected to corresponding edges of plates of one polarity, and the other to the opposite edges of the plates of the other polarity.

The invention also includes a method of assembling a cell which includes assembling the plates of one polarity in a jig with corresponding edges lying in a plane but the spacing of end plates greater than that of middle plates, and spot-welding the plate strap to their aligned edges.

The present invention may be put into practice in various ways but one specific embodiment will now be briefly described by way of example with reference to the accompanying drawings in which.

In the specific embodiment to be described the positive and negative plates 10 and 15 are of pocket type each comprising a rectangular pocket of perforated material containing active material of the types customarily used in a nickel cadmium cell. In order that this may form an element of roughly cylindrical shape when assembled, with the plates in planes parallel to the axis, the plates in the middle of the stack are wider than those at the outsides. Thus, there are six negative plates 15 of which as shown in FIG. 2, the middle two are widest, the outer two are narrowest and the remaining two are of intermediate width. In the case of the five positive plates the middle three may, as shown in FIG. 1, be all of the maximum width and the outer two of a lesser width.

Figure 1:
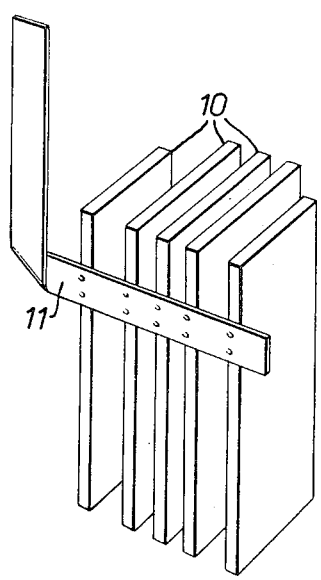
FIG. 1 is a perspective view of the positive plates and plate strap for an alkaline cell.
Figure 2:
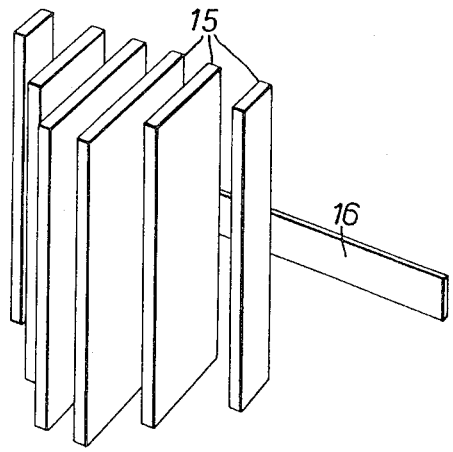
FIG. 2 is a perspective view of the negative plates and plate strap for an alkaline cell.

The plates of each polarity are assembled, as shown in FIGS. 1 and 2, in a jig (not shown) with one edge of each aligned in a common plane at right angles to that of the plates. The jig is such that the outer plates are spaced further from their neighbours than the inner plates and connector strips 11 and 16 of metal foil are placed in position across the aligned edges of the positive and negative plates and spot welded to the edge of each pocket. The spot welder is of the series spot weld type in which welding current flows through one electrode into the work piece and then cut again to the second electrode, so that two spots are welded in the same operation.

Figure 3:
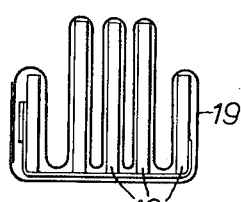
FIGS. 3 to 7 show the stages of assembly of an alkaline cell in accordance with the present invention.
Figure 4:
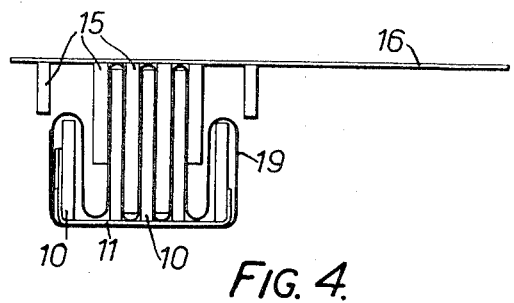
Figure 5:
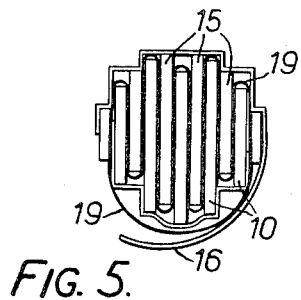
Figure 6:
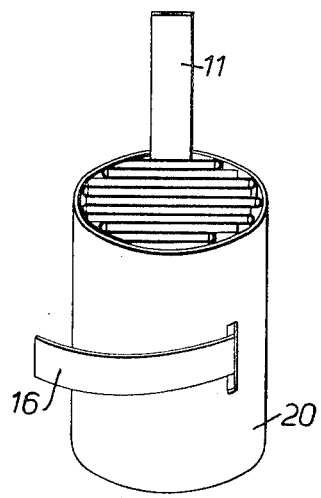

When both positive and negative plate groups have been so welded a strip of separator material 19, such as nylon, is folded in a zig-zag or concertina fashion around the positive plates 10, as shown in FIG. 3, and, as shown in FIG. 4, the plates 10 and 11 are intercalated with the separator material 19 between them passing around the edge of each plate opposite that to which the connector is welded. The intermeshed group is brought to a roughly cylindrical form, as shown in FIGS. 5 and 6, by hand pressure, and the assembly is complete by fitting a shrink-on plastic sleeve 20.

Figure 7:
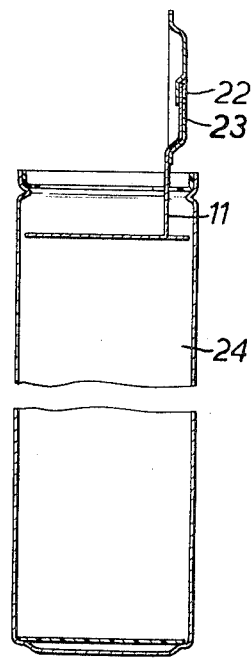
Figure 8:
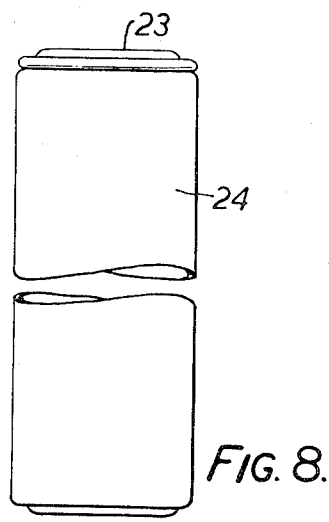
FIGS. 8 and 9 show, in elevation and plan respectively, a small alkaline cylindrical cell, suitable, for example, for replacing a conventional type of primary "dry" cell, made in accordance with the present invention.
Figure 9:
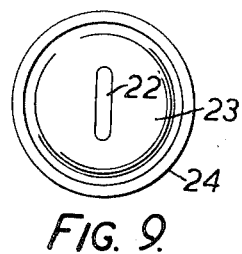

One plate strap, in the specific embodiment the positive plate strap 11, is folded along the line at 45° to its length so as to extend to one end of the casing for connection to a suitable terminal 22 for example, as shown in FIG. 7, by spot welding to a lid 23 of a casing 34. The other plate strap 16 may be similarly treated or it may, as shown in FIG. 6, pass through a slot in the plastic sleeve 20 and make connection (e.g., pressure contact) with the cylindrical wall of the casing 24, depending on requirements. In the latter case the strip may be welded to the pockets about midway in their length, as shown in FIG. 2, whereas a strip for connection to an end terminal may be welded between the middle and the corresponding end. The extra spacing between outer plates when in the jig provides the necessary length of connector to extend obliquely between them when finally assembled.

The element is then inserted in its casing and the case closed, and the terminals connected in any conventional way. For a sealed cell some form of safety vent may be included.

What I claim as my invention and desire to secure by Letters Patent is:

1. An electric cell of alkaline type having substantially planar rectangular positive and negative plates of pocket type interleaved in a cylindrical casing and lying in planes parallel to the axis of the casing, the outer plates being narrower than the middle ones, in which the plates of each polarity are provided with a plate strap of foil strip, one said plate strap passing circumferentially around and being welded to corresponding longitudinal edges of plates of one polarity, and said other plate strap passing similarly around and being welded to corresponding longitudinal edges of the plates of the other polarity, to connect the plates of each polarity together and to an external terminal.

2. A cell as claimed in claim 1 in which at least one plate strap is folded along a line at about 45° to its length in order that it may extend to one end of the cell.

3. A cell as in claim 1 in which one plate strap is connected to corresponding edges of plates of one polarity, and the other to the opposite edges of the plates of the other polarity.

4. A cell as in claim 3 in which the plates are separated by a strip of separator material folded zig-zag fashion around the edges of the plates of each polarity opposite to those to which the plate strap is secured.

5. A method of assembling an electric cell of the alkaline type having substantially plane rectangular positive and negative plates of the pocket type in a cylindrical casing lying in planes parallel to the axis of the casing, the outer plates being narrower than the middle ones, by assembling the plates of each polarity in a jig in parallel planes with one longitudinal edge of each lying in a common plane and the spacing of the end plates greater than that of the middle plates, spot welding a plate strap transversely to the aligned plate edges of each polarity to interconnect them, interleaving the positive and negative plates with separators with the previously aligned edges lying on a convexly curved surface, and inserting the interleaved plates into a casing.

* * * * *